June 2, 1959  R. W. BUNTENBACH  2,889,465
ELECTRIC PULSE GENERATOR

Filed Dec. 12, 1955  3 Sheets-Sheet 2

INVENTOR.
Rudolph W. Buntenbach
BY *Lippincott and Smith*
Attorneys

INVENTOR.
Rudolph W. Buntenbach

United States Patent Office 2,889,465
Patented June 2, 1959

2,889,465

ELECTRIC PULSE GENERATOR

Rudolph W. Buntenbach, Lafayette, Calif., assignor, by mesne assignments, to the United States of America as represented by the United States Atomic Energy Commission Application December 12, 1955, Serial No. 552,410

4 Claims. (Cl. 250—217)

This invention relates to electric pulse generators, and in particular to electro-optical apparatus for generating electric pulses in programmed sequences at times and with durations that can be controlled with exceptionally great accuracy.

An object of this invention is to provide improved apparatus for generating electric pulses with accurately controlled and easily adjustable occurrence times.

Another object is to provide improved apparatus for generating electric pulses with accurately controlled and easily adjustable durations.

Another object is to provide improved apparatus for generating a plurality or sequence of electric pulses in accordance with a prearranged program that can be changed by simple changes or adjustments of the apparatus.

Other objects and advantages will appear as the description proceeds.

Briefly stated, in accordance with one aspect of this invention, the cathode-ray oscillograph tube is supplied with two sinusoidal deflection signals in phase quadrature to produce a luminous spot that moves continuously and repetitively at constant angular velocity along a circular path. An opaque mask having a transparent aperture alined with this path transmits light from the luminous spot to a photoelectric transducer only while the spot is alined with the aperture, so that the transducer produces a substantially rectangular waveform electric pulse at each revolution of the spot around its circular path. To provide fast decays of the electric pulses, the screen of the cathode-ray tube, which preferably comprises a phosphor that emits ultraviolet light when excited by electron bombardment, is positioned behind a filter that transmits only ultraviolet light, while the photoelectric transducer, which is responsive to ultraviolet light, is positioned in front of the filter.

The time of occurrence of the electric pulses can be adjusted by rotating the mask, and the duration of the pulses is controlled by the width of the aperture in the mask, which may be changed merely by changing the mask or by adjusting a mask hereinafter described that has an aperture of adjustable width. If desired, more than one pulse per revolution of the luminous spot can be generated by providing a mask having a plurality of apertures.

A plurality of similar cathode-ray devices may be employed in an arrangement wherein the luminous spots are rotated in synchronism, by applying the same deflection signals to each of the cathode-ray tubes, for example. By separate adjustment of the mask of each such device, accurately timed pulses may be generated in accordance with any desired sequence or program. If desired, the two pulses so produced can be used to trigger an electronic pulse producing circuit on and off, respectively, to provide a pulse of accurately controlled and easily adjusted duration.

A plurality of similar cathode-ray devices may also be employed in arrangements wherein the luminous spots are rotated with different angular velocities, preferably integral multiples of one another, by applying deflection signals of different frequencies to respective ones of the cathode-ray tubes. This produces a plurality of pulse trains in which the pulses have different durations and repetition rates. Gating means controlled by pulses of one pulse train transmit only selected pulses from another pulse train, and by adjustment of the masks transmitted pulses of very short duration can be produced at times controlled with great accuracy within a relatively long time interval.

The invention will be better understood from the following description taken in connection with the accompanying drawings, and its scope will be pointed out in the appended claims. In the drawings, Fig. 1 is a schematic diagram of apparatus embodying principles of this invention;

Figure 1:
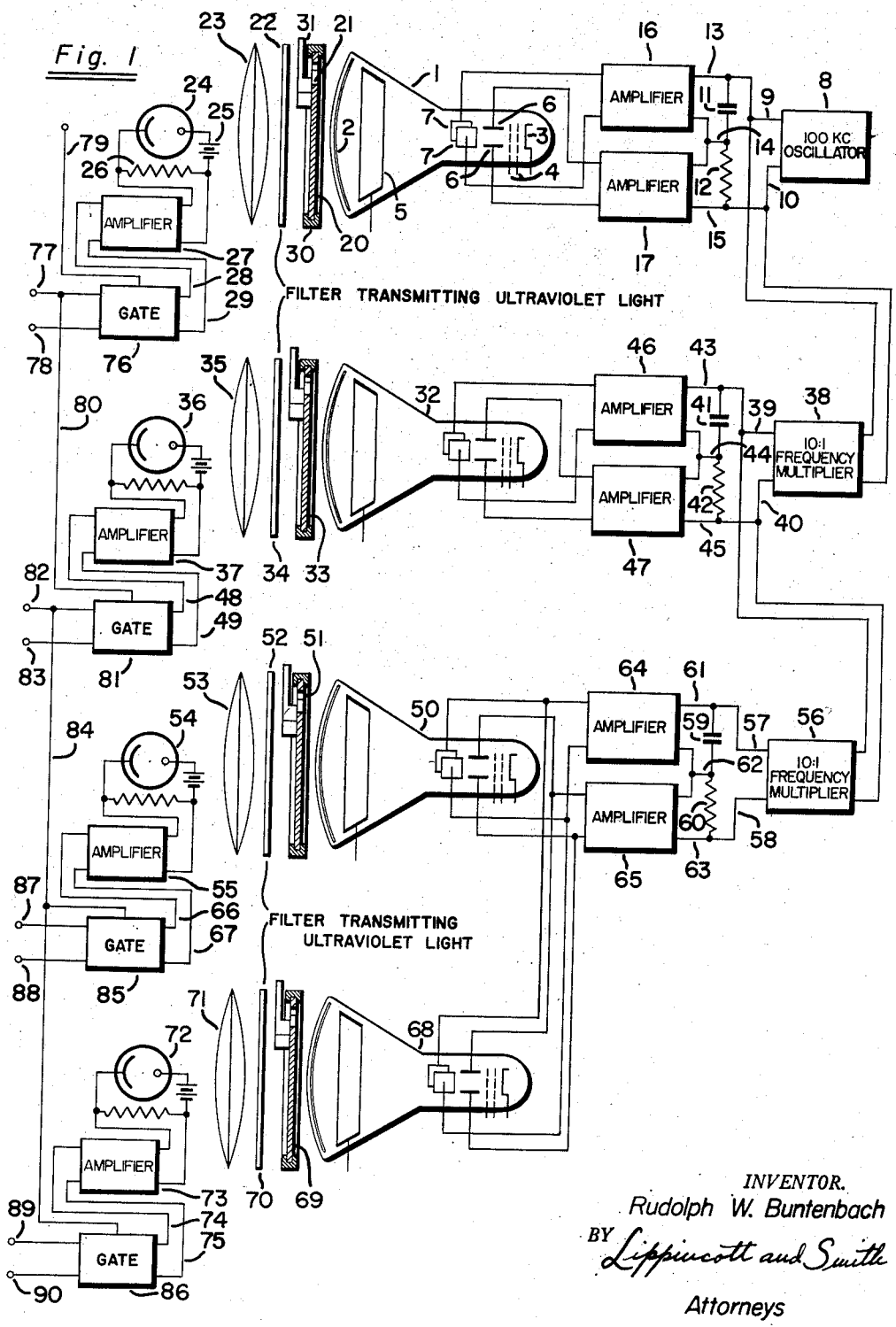
Figure 2:
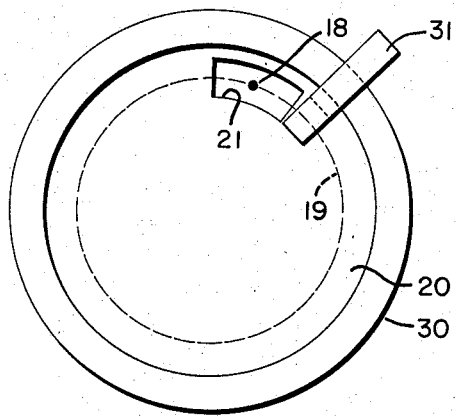
Fig. 2 is an end view of a mask used in the Fig. 1 apparatus.

Referring now to Figs. 1 and 2 of the drawings, a conventional cathode-ray oscillograph tube has an evacuated envelope 1 containing a cathodoluminescent screen 2, and an electron gun comprising cathode 3 and accelerating and focusing electrodes 4. The electron gun provides a focused electron beam within the envelope 1 that bombards a portion of screen 2 to produce a small luminous spot. Preferably the screen 2, which may be coated upon the face of envelope 1, is made from a phosphor that emits ultraviolet light when excited by electron bombardment. Generally visible light will also be emitted. For example, a phosphor of the type known commercially as "P15" may be employed. Envelope 1 also contains a conventional collecting electrode 5, a pair of vertical deflecting plates 6, and a pair of horizontal deflecting plates 7.

An oscillator 8 supplies between leads 9 and 10 an electric signal having a sinusoidal waveform and a predetermined frequency, 100 kilocycles per second, for example. This signal is applied across a phase-shifting network, comprising a capacitor 11 connected in series with the resistor 12, to provide between leads 13 and 14 and between leads 14 and 15 two sinusoidal waveform electric signals in phase quadrature. The signal between leads 13 and 14 is amplified by an amplifier 16 and applied between horizontal deflection plates 7, while the signal between leads 14 and 15 is amplified by an amplifier 17 and applied between the vertical deflection plates 6. Consequently, as is well known to those skilled in the electronics art, the electron beam within envelope 1 is deflected in such a way that the luminous spot 18 moves continuously and repetitively along a circular path, indicated in Fig. 2 by broken line 19, at a constant speed of 100,000 revolutions per second.

A circular sweep pattern is especially advantageous in the apparatus herein described for several reasons. It facilitates adjustment of the pulse time positions, as hereinafter explained, and provides a relatively long sweep path for accurate timing of the pulses that are generated. The electron beam travels a path of constant length, and therefore can easily be focused to a small spot of constant size. Sinusoidal deflection signals that are easily generated provide constant sweep velocities.

An opaque mask 20 has a transparent aperture 21 that is alined with a portion of circular path 19. Light emitted by luminous spot 18 is transmitted through mask 20 only when the spot 18 is alined with aperture 21. A filter 22 transmits the ultraviolet portion of this light, but is opaque to visible portions of this light. Ultraviolet light transmitted by filter 22 is focused by a lens system 23 onto the cathode of a phototube 24 or other photoelectric transducer. Operating voltage of phototube 24 is supplied by suitable means such as battery 25, and each time that the cathode of the phototube is illuminated an electric pulse of substantially rectangular waveform is produced across a load resistor 26. These pulses are amplified by an amplifier 27 and applied between leads 28 and 29.

As luminous spot 18 travels around circular path 19 at a speed of 100,000 revolutions per second, a pulse of ultraviolet light is transmitted to phototube 24 each time that spot 18 comes into alinement with aperture 21, and consequently a train of rectangular waveform electric pulses is provided between leads 28 and 29 having a repetition rate of 100,000 pulses per second. The length of each pulse is determined by the angular width of aperture 21. Assume, for example, that aperture 21 has an angular width of 36 degrees, or 1/10 of a revolution. Then the duration of each pulse is 1/10 of the period of the sinusoidal signal supplied by oscillator 8, or 1 microsecond. Since the frequency of an oscillator can be controlled with great precision, both the repetition rate and the duration of the generated pulses are very accurately controlled.

The repetition rate can be changed, if desired, by changing the frequency of oscillator 8, and the pulse duration can be changed without changing the repetition rate, if desired, by changing the width of aperture 21—by substituting a different mask in place of mask 20, for example. Furthermore, masks having more than one aperture may be utilized to provide a plurality of electric pulses during each revolution of spot 18. When a plurality of apertures are so used, they may be of different widths to provide pulses of different durations, and they may be spaced along the circular scanning path in any arbitrarily chosen manner.

The time of occurrence or time position of each electric pulse with respect to a cycle of the signal supplied by oscillator 8 can be adjusted by adjusting the angular position of mask 20. For this purpose mask 20 may be rotatively mounted in a stationary supporting frame 30 and a tab 31 or the like attached to mask 20 may be provided for rotating the mask within its supporting ring. The rise and decay times of the electric pulses are determined by the size of the luminous spot 18, the persistence of the phosphor used in screen 2, and the characteristics of phototube 24 and amplifier 27. In practice, the rise time may easily be made extremely short, and the limiting factor with respect to the delay time generally is the persistence of the phosphor.

Fast pulse decay times are provided by utilizing only the ultraviolet light emitted by luminous spot 18 to operate phototube 24. For example, a "P15" phosphor emits visible light after electron bombardment ceases with a decay time in the order of 0.4 to 1.5 microseconds, and emits ultraviolet light with a decay time in the order of 0.05 microsecond. Consequently, the decay time of the pulses is greatly decreased, and more nearly rectangular electric pulses are produced, by using a phosphor that emits ultraviolet as well as visible light, and by filtering out the visible light so that only the ultraviolet light operates the phototube.

A second electro-optical system comprises a cathode-ray tube 32, a mask 33, a filter 34 that transmits only ultraviolet light, a lens system 35, a phototube 36 and an amplifier 37. A frequency multiplier 38 multiplies the frequency of the signal supplied by oscillator 8 and provides between leads 39 and 40 an electric signal having a frequency that is an integral multiple of the frequency supplied by the oscillator. For example, oscillator 8 may provide a signal having a frequency of 100 kilocycles per second, and frequency multiplier 38 may multiply this frequency by a factor of ten, thereby providing between leads 39 and 40 an electric signal having a sinusoidal waveform and a frequency of one megacycle per second.

The one-megacycle signal is applied across a phase-shifting network, comprising a capacitor 41 and a resistor 42, to provide between leads 43 and 44 and between leads 44 and 45 two sinusoidal electric signals in phase quadrature. The signal between leads 43 and 44 is amplified by an amplifier 46 and applied to the horizontal deflection plates of cathode-ray tube 32. The signal between leads 44 and 45 is amplified by an amplifier 47 and supplied to the vertical deflection plates of cathode-ray tube 32. Consequently, the luminous spot on the screen of cathode-ray tube 32 moves continuously and repetitively along a circular path at a constant speed of one million revolutions per second.

The optical system comprising cathode-ray tube 32 may be identical to that comprising cathode-ray tube 1, except for the frequencies of the deflection signals. Consequently, assuming that the transparent aperture of mask 33 has an angular width of 36°, amplifier 37 supplies between leads 48 and 49 a train of rectangular waveform electric pulses having a repetition rate of one million pulses per second and having a pulse duration of one-tenth microsecond. The time position of these pulses may be adjusted by adjusting the angular position of mask 33.

Another electro-optical system comprises a cathode-ray tube 50, a mask 51, a filter 52 that transmits only ultraviolet light, a lens system 53, a phototube 54, and an amplifier 55. A frequency multiplier 56 multiplies the frequency of the one-megacycle signal provided by multiplier 38 by a factor of ten, and provides between leads 57 and 58 a sinusoidal electric signal having a frequency of ten megacycles per second. The ten-megacycle signal is applied across a phase-shifting network comprising capacitor 59 and resistor 60 to provide between leads 61 and 62 and between leads 62 and 63 two sinusoidal electric signals in phase quadrature.

The signal between leads 61 and 62 is amplified by an amplifier 64 and supplied to the horizontal deflection plates of cathode-ray tube 50. The signal between leads 62 and 63 is amplified by an amplifier 65 and supplied to the vertical deflection plates of cathode-ray tube 50. Consequently, a luminous spot on the screen of cathode-ray tube 50 is moved continuously and repetitively along a circular path at a speed of ten million revolutions per second. Except for the frequencies of the deflection signals, the electro-optical system comprising cathode-ray tube 50 may be identical to that comprising cathode-ray tube 1. Accordingly, amplifier 55 supplies between leads 66 and 67 a train of electric pulses having a repetition rate of 10,000,000 pulses per second and a pulse duration of approximately 1/100 microsecond. The time position of these pulses can be adjusted by rotating mask 51.

Still another electro-optical system comprises a cathode-ray tube 68, a mask 69, a filter 70 that transmits only ultraviolet light, a lens system 71, a phototube 72 and an amplifier 73. The optical system comprising cathode-ray tube 68 may be identical to that comprising cathode-ray tube 50, and both of these cathode-ray tubes are supplied with the same deflection signals by amplifiers 64 and 65. Consequently, amplifier 73 provides between leads 74 and 75 still another train of electric pulses having a repetition rate of 10,000,000 pulses per second and a pulse duration of approximately 1/100 microsecond. The time position of these pulses can be adjusted by adjusting the angular position of mask 69.

In summary, the apparatus thus far described produces four separate trains of electric pulses: a first train of pulses having a repetition rate of 100,000 pulses per second and a pulse duration of one microsecond; a second train of electric pulses having a repetition rate of 1,000,000 pulses per second and pulse duration of one-tenth microsecond; and third and fourth pulse trains each having a repetition rate of 10,000,000 pulses per second and pulse durations of approximately 1/100 microsecond. The time position of the pulses in each train can be independently adjusted by adjusting the angular positions of masks 20, 33, 51 and 69.

By making obvious changes in the apparatus, any number of separate pulse trains can be generated having pulse repetition rates, pulse durations, and pulse time positions in any desired relationship. Thus pulses can be generated in accordance with a great variety of pre-selected programs, and the program can readily be changed whenever desired, in most cases merely by changing or adjusting the masks of the several electro-optical systems. Such apparatus is useful for a great variety of purposes, and is particularly useful in high-speed photography wherein the pulses operate or trigger the operation of electronic camera shutters to provide a plurality of photographic exposures of a rapidly changing event in accordance with any pre-selected sequence or program.

For precisely locating a selected time within a relatively long time interval, as may be desired in high-speed photography, means may be provided for transmitting the shorter pulses only when they are coincident with one or more of the longer pulses. For this purpose a gate 76 is connected between leads 28 and 29 and a pair of output terminals 77 and 78. Gate 76 transmits the pulses provided by amplifier 27 only when a positive voltage is applied to the gate through a lead 79.

Whenever the transmission of an electric pulse to terminal 77 or 78 is desired, a positive electric pulse is supplied to lead 79 by any suitable means, which may be another pulse generator similar to that herein described but operated to produce pulses having longer durations and smaller repetition rates, or may be any other type of switching or pulse generating means.

Assume, for example, that a positive pulse having a duration of ten microseconds is supplied to lead 79 during a selected cycle of the signal provided by oscillator 8. During one-tenth of this cycle, at a time determined by the position of the mask 20, a positive electric pulse having a duration of one microsecond is applied to output terminal 77. The one-microsecond pulse is supplied through a lead 80 to a gate 81 connected between leads 48 and 49 and output terminals 82 and 83. During this one-microsecond time interval, at a time determined by the angular position of the mask 33, a positive electric pulse having a duration of 1/10 microsecond is transmitted by gate 81 to output terminal 82. The one-tenth microsecond pulse is also transmitted through lead 84 to gates 85 and 86.

Gate 85 is connected between leads 66 and 67 and output terminals 87 and 88, while gate 86 is connected between leads 74 and 75 and output terminals 89 and 90. During the selected 1/10 microsecond interval, at a time depending upon the angular position of mask 51, gate 85 transmits to output terminal 87 an electric pulse having a duration of approximately 1/100 microsecond. During the same one-tenth microsecond interval, at a time depending upon the angular position of mask 69, gate 86 transmits to output terminal 89 an electric pulse having a duration of approximately 1/100 microsecond. Accordingly, pulses may be provided at terminals 87 and 89 at times differing by any selected time interval up to one-tenth microsecond, and these two pulses may be accurately placed at any desired time position within the ten-microsecond period of the selected cycle of the signal generated by oscillator 8.

The oscillator, frequency multipliers, amplifiers, and gates used in the apparatus herein described may be any of many conventional types of such devices well known to those skilled in the art, and any further description thereof would be superfluous. Furthermore, many changes may be made in the apparatus disclosed without departing from the broader principles of this invention. Different oscillator frequencies may be used, and also different frequency multiplication ratios. Instead of operating the oscillator at the lowest deflection frequency and using frequency multiplication to obtain higher deflection frequencies, the oscillator may be operated at the highest deflection frequency or at an intermediate deflection frequency, and lower deflection frequencies may be obtained by well-known frequency division techniques. Greater or lesser numbers of similar electro-optical systems may be used to generate as many pulse trains as may be desired.

Instead of using gates connected to the pulse amplifier outputs, the gates may be connected to the pulse amplifier inputs, or the gates may be connected in series with the deflection amplifiers so that the luminous spots come into alinement with the mask apertures only when the production of output pulses is desired. Alternatively, the cathode-ray tubes may be used as gates by normally biasing to cut-off conventional control grids associated with the cathode-ray tube electron guns, and applying the gating pulses to these control grids so that the cathodo-luminescent screens are bombarded by electrons only at times when the production of output pulses is desired. Although deflection of the electron beams to move the luminous spots around circular scanning paths is especially advantageous and is preferred, other scanning patterns may be employed satisfactorily in some instances.

Instead of using masks having large opaque areas and small transparent areas, masks may be used that have large transparent areas and small opaque areas, so that an electric pulse is generated when light to the phototube is cut off. The essential requirement with respect to the masks is that different portions thereof alined with the scanning path of the luminous spot must have different optical transmittance values.

Figure 3:
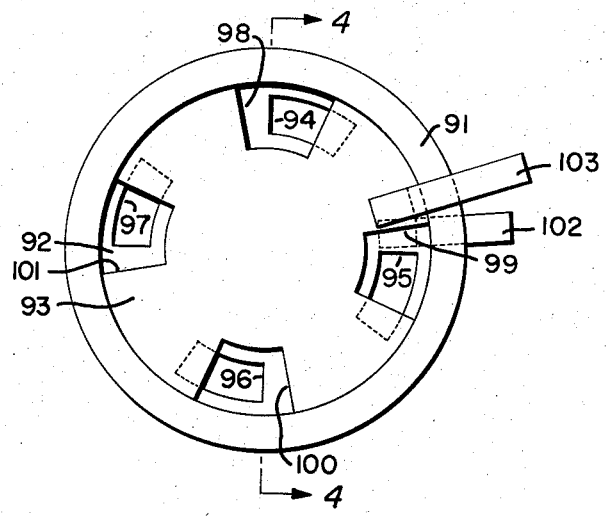
Fig. 3 is an end view of an alternative mask.
Figure 4:
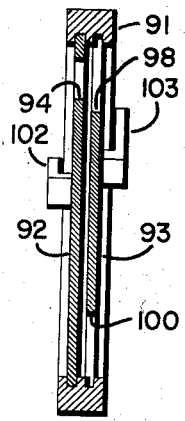
Fig. 4 is a section taken generally along the line 4—4 of Fig. 3.

Reference is now made to Figs. 3 and 4 of the drawings, which illustrate an alternative mask with which a plurality of pulses may be generated during each revolution of a luminous spot, and with which the pulse duration may be adjusted without replacing the mask. A stationary supporting ring 91 supports two mutually parallel and independently rotative opaque masks 92 and 93. Mask 92 has a plurality of transparent apertures 94, 95, 96 and 97, and mask 93 has a similar plurality of transparent apertures 98, 99, 100 and 101, arranged as shown. A tab 102 is attached to mask 92, and tab 103 is attached to mask 93, so that the two masks may be conveniently rotated independently. Light is transmitted from the luminous spot of the cathode-ray tube to the phototube only when the spot is alined with both an aperture of mask 92 and an aperture of mask 93. Consequently, the effective width of the composite aperture, and hence the duration of the electric pulse, can be adjusted by rotating mask 93 relative to mask 92. Since there are four such composite apertures alined with the circular path of the luminous spot, four electric pulses are produced during each revolution of the spot.

Figure 5:
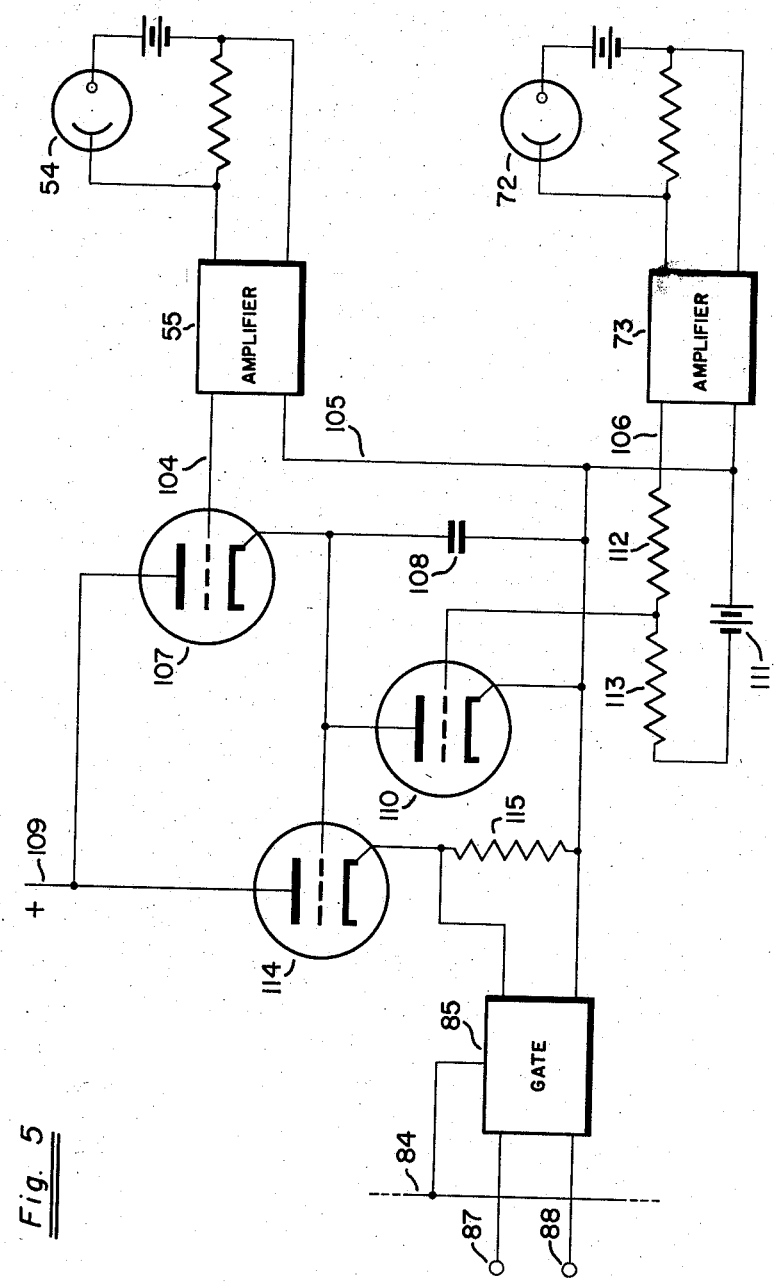
Fig. 5 is a fragmentary circuit diagram of apparatus for producing pulses of accurately controlled and easily adjusted duration.

As hereinbefore explained the apparatus illustrated in Figs. 1 and 2 provides at the outputs of amplifiers 55 and 73, respectively, two trains of electric pulses each having a repetition rate of 10,000,000 cycles per second; and by adjusting the relative positions of masks 51 and 69 the time interval between the beginning of each pulse in one train and the beginning of the next following pulse in the other train can be adjusted to any selected value up to 1/10 microsecond. If desired, these two trains of pulses can be used to trigger "on" and "off," respectively, a pulse-producing circuit to provide electric pulses having accurately controlled and easily adjusted durations of any selected value up to 1/10 microsecond. A modification of the Fig. 1 circuit for this purpose is shown in Fig. 5, which is a fragmentary circuit diagram illustrating only the modified portions of the Fig. 1 circuit. Other parts of the apparatus may be identical to that shown in Fig. 1.

Referring now to Fig. 5 of the drawings, phototube 54 and amplifier 55, which are identical to correspondingly numbered parts of Fig. 1, provide between leads 104 and 105 a train of positive electric pulses having a repetition rate of 10,000,000 pulses per second and a pulse duration of approximately 1/10 microsecond, while phototube 72 and amplifier 73 provide between leads 106 and 105 another train of electric pulses having a repetition rate of 10,000,000 pulses per second and a pulse duration of approximately 1/10 microsecond, in the manner hereinbefore explained in connection with Figs. 1 and 2. The time interval between the beginning of each positive pulse supplied to lead 104 and the beginning of the next following positive pulse supplied to lead 106 can be adjusted to any desired value up to 1/10 microsecond by adjusting the relative angular positions of masks 51 and 69 in the apparatus illustrated in Fig. 1.

An electron discharge device 107, preferably a triode vacuum tube, has a control grid connected to lead 104 and a cathode connected through a capacitor 108 to lead 105. Device 107 has an anode connected to a lead 109 that is supplied with a positive electric potential by conventional voltage supply means, not shown. A second electron discharge device 110, preferably a triode vacuum tube, has a control grid connected to lead 106, a cathode connected to lead 105, and an anode connected to the cathode of device 107. A negative bias voltage is supplied to the control grid of device 110 by any suitable means, such as battery 111 and bias circuit resistors 112 and 113, connected as shown. This negative bias voltage maintains device 110 in a "cut off" or non-conductive condition except when positive pulses are supplied to its control grid through lead 106.

A third electron discharge device 114, preferably a triode vacuum tube, has a control grid connected to the anode of device 110 and the cathode of device 107, has a cathode connected through a resistor 115 to lead 105, and has an anode connected to the lead 109, so that the anode of device 114 is maintained at a positive potential. The cathode of device 114 is connected to the input of gate 85, as shown.

Whenever a positive voltage pulse is supplied to lead 104 by phototube 54 and amplifier 55, electron discharge device 107 becomes conductive and capacitor 108 is charged to a positive potential. As soon as capacitor 108 is fully charged, electron discharge device 107 is again "cut off," since device 110 is non-conductive at this time and there is no D.-C. circuit for the cathode current of device 107. Upon termination of the positive pulse supplied through lead 104, device 107 remains "cut off" and capacitor 108 remains charged, since there is no discharge circuit for the capacitor as long as device 110 remains non-conductive.

When the next positive pulse is supplied through lead 106 to the control grid of device 110, the electron discharge device 110 becomes conductive and capacitor 108 quickly discharges through device 110. Consequently, the voltage across capacitor 108 is a pulse of substantially rectangular waveform having a duration substantially equal to the time interval between the beginning of a positive pulse supplied to lead 104 and the beginning of the next following positive pulse supplied to lead 106. As hereinbefore explained, this time interval can be accurately adjusted to any selected value up to 1/10 microsecond.

The voltage pulse thus produced across capacitor 108 is supplied to the control grid of electron discharge device 114, which acts as a conventional cathode follower to transmit the voltage pulse to the input of gate 85. The gate is controlled by the potential of lead 84, as hereinbefore explained in connection with Fig. 1, and if the gate is open an accurately timed pulse is transmitted from the cathode of electron discharge device 114 through gate 85 to output terminals 87 and 88.

This embodiment of the invention is especially useful in systems for high-speed photography wherein an image converter tube is used as a high-speed camera shutter controlled by the voltage pulse supplied between terminals 87 and 88. In such a system, the photographic exposure time is substantially equal to the duration of the pulse between terminals 87 and 88, and can be adjusted to any selected value up to 1/10 microsecond.

It should be understood that this invention in its broader aspects is not limited to specific embodiments herein illustrated and described, and that the following claims are intended to cover all changes and modifications that do not depart from the true spirit and scope of the invention.

What is claimed is:

1. An electric pulse generator comprising a first cathodoluminescent screen, means bombarding a portion of said first screen with a first electron beam to produce a first luminous spot, means deflecting said first beam to move to said first spot repetitively along a path on said first screen, a first mask having opaque portions and a transparent portion alined with said path on said first screen, photoelectric means converting light transmitted by said transparent portion of said first mask into a first train of electric pulses, a second cathodoluminescent screen, means bombarding a portion of said second screen with a second electron beam to produce a second luminous spot, means deflecting said second beam to move said second spot repetitively along a path on said second screen, a second mask having opaque portions and a transparent portion alined with said path on said second screen, photoelectric means converting light transmitted by said transparent portion of said second mask into a second train of electric pulses, and circuit means jointly responsive to said first train of pulses and said second train of pulses for providing a third train of electric pulses.

2. An electric pulse generator comprising a first evacuated envelope containing a first cathodoluminescent screen, electron gun means providing within said first envelope a first focused electron beam bombarding a portion of said first screen to produce a first luminous spot, means deflecting said first beam to move said first spot continuously and repetitively at a first constant angular velocity along a first circular path, a first opaque mask having an aperture alined with said first path, a first photoelectric transducer converting light transmitted from said first spot through the aperture of said first mask into a first train of electric pulses, a second evacuated envelope containing a second cathodoluminescent screen, electron gun means providing within said second envelope a second focused electron beam bombarding a portion of said second screen to produce a second luminous spot, means deflecting said second beam to move said second spot continuously and repetitively at a second constant angular velocity along a second circular path, said second velocity being an integral multiple of said first velocity, a second opaque mask having an aperture alined with said second path, a second photoelectric transducer converting light transmitted from said second spot through the aperture of said second mask into a second train of electric pulses, and gating means controlled by pulses of said first train for transmitting only selected pulses of said second train, thereby providing a third train of electric pulses having a pulse rate that is a selected submultiple of the pulse rate of said second train.

3. An electric pulse generator comprising a first cathodoluminescent screen, means bombarding a portion of said first screen with a first electron beam to produce a first luminous spot, means deflecting said first beam to move said first spot repetitively along a path on said first screen, a first mask having opaque portions and a transparent portion alined with said path on said first screen, photoelectric means converting light transmitted by said transparent portion of said first mask into a first train of electric pulses, a second cathodoluminescent screen, means bombarding a portion of said second screen with a second electron beam to produce a second luminous spot, means deflecting said second beam to move said second spot repetitively along a path on said second screen, a second mask having opaque portions and a transparent portion alined with said path on said second screen, photoelectric means converting light transmitted by said transparent portion of said second mask into a second train of electric pulses, and a pulse-producing circuit controlled by said first train of electric pulses to initiate each pulse of a third train of electric pulses and controlled by said second train of electric pulses to terminate each pulse of said third train of electric pulses.

4. An electric pulse generator comprising a first evacuated envelope containing a first cathodoluminescent screen, electron gun means providing within said first envelope a first focused electron beam bombarding a portion of said first screen to produce a first luminous spot, means deflecting said first beam to move said first spot continuously and repetitively at a constant angular velocity along a first circular path, a first opaque mask having an aperture alined with said first path, a first photoelectric transducer converting light transmitted from said first spot through the aperture of said first mask into a first train of electric pulses, a second evacuated envelope containing a second cathodoluminescent screen, electron gun means providing within said second envelope a second focused electron beam bombarding a portion of said second screen to produce a second luminous spot, means deflecting said second beam to move said second spot continuously and repetitively at a constant angular velocity along a second circular path, said two angular velocities being equal, a second opaque mask having an aperture alined with said second path, a second photoelectric transducer converting light transmitted from said second spot through the aperture of said second mask into a second train of electric pulses, a capacitor, means charging said capacitor upon the occurrence of each pulse of said first train, and means discharging said capacitor upon the occurrence of each pulse of said second train, whereby voltage pulses are provided across said capacitor that have a duration equal to the time interval between the occurrence of a pulse of said first train and the next following pulse of said second train.

References Cited in the file of this patent

UNITED STATES PATENTS

| | | |
|---|---|---|
| 1,450,061 | Coblentz | Mar. 27, 1923 |
| 1,894,637 | Scheibell | Jan. 17, 1933 |
| 2,144,337 | Koch | Jan. 17, 1939 |
| 2,398,552 | Norton | Apr. 16, 1946 |
| 2,476,985 | Levy | July 26, 1949 |
| 2,733,358 | Carapellotti | Jan. 31, 1956 |
| 2,782,366 | Wall | Feb. 19, 1957 |
| 2,794,066 | Mullin | May 28, 1957 |
| 2,837,687 | Thompson et al. | June 3, 1958 |